(12) United States Patent
Harris (10) Patent No.: US 8,365,219 B2
(45) Date of Patent: Jan. 29, 2013

(54) REMOTE FRAMES

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 443 days.

(21) Appl. No.: 12/723,653

(22) Filed: Mar. 14, 2010

(65) Prior Publication Data

US 2011/0221964 A1    Sep. 15, 2011

(51) Int. Cl.
*H04N 5/445* (2006.01)
(52) U.S. Cl. .......................................................... 725/40
(58) Field of Classification Search ...................... 725/40
See application file for complete search history.

(56) References Cited

U.S. PATENT DOCUMENTS

| | | | | |
|---|---|---|---|---|
| 5,815,145 | A * | 9/1998 | Matthews, III | 725/41 |
| 6,693,652 | B1 * | 2/2004 | Barrus et al. | 715/838 |
| 2008/0183843 | A1 * | 7/2008 | Gavin et al. | 709/217 |
| 2008/0187231 | A1 * | 8/2008 | Barbieri et al. | 382/225 |

OTHER PUBLICATIONS

Nevo User Manual, Mar. 14, 2010.
Pronto Edit Professional, User Manual, Mar. 14, 2010.
Logitech Harmony 900 User Manual, Mar. 14, 2010.
Universal Remote MX-980 user manual, Mar. 14, 2010.

* cited by examiner

*Primary Examiner* — Dominic D Saltarelli
(74) *Attorney, Agent, or Firm* — Law Office of Scott C. Harris, Inc.

(57) ABSTRACT

A device that can operate according to a menu. A first aspect describes an array of preview frames were each preview frame can represent a program such as a video program or an intranet site. A selection window within the array allows selecting different preview frames Another aspect describes use of this sliding array system within a GPS device.

17 Claims, 4 Drawing Sheets

REMOTE FRAMES

BACKGROUND

Many different devices are controlled using remote controls. For example, a television device or other kind of media player is often controlled by remote control. Other electronic devices including household appliances, or any other kind of device, are often controlled in the same way. Many electronic devices may be difficult or impossible to control from the device itself, thereby only allowing control via the remote. Therefore, the remote control becomes much more sophisticated. In contrast, the controls that are controllable from the device (e.g., the television) itself may be less sophisticated.

Universal remotes can be used to control many different devices.

SUMMARY

The present application describes techniques including menus for electronic devices.

Another embodiment describes a new way of controlling devices using remote controls.

Another embodiment describes use of these remote control techniques to allow more information to be viewed from a smaller screen.

DETAILED DESCRIPTION

Figure 1:
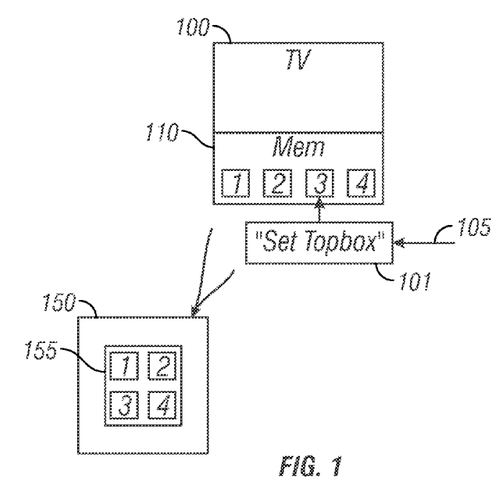
FIG. 1 shows a basic embodiment of a television or other video device 100 being controlled by a remote control.

FIG. 1 shows a video device, here television 100 being controlled by a remote control 150. In the embodiment, the television 100 receives input from a source of viewable content, e.g., video programming, 105 e.g. cable or network or a line from a set top box 101 such as a Tivo or DVD or Bluray player. In this embodiment, the television 100 or set top box is itself capable of storing at least some amount of time of the information.

For example, the television or the set top box may be able to store certain frames or times of information in a memory 110. Embodiments may do this to enable a so-called freeze-frame operation or a digital video recording function, or to do a live tv pause, or a 5-30 second review, for example. The memory 110 may also be able to store for example many frames 111 of information e.g. separated information, or the like. In one embodiment, this may store a number of key frames within a compressed video system.

According to another embodiment, the television may itself have a video recording function e.g. a digital video recorder function, and the memory 110 may be a hard drive that stores many GBs or TBs of video information.

In a first embodiment, the key frames of a video may be stored, for example, as part of an operation of decompressing incoming information from the cable or network. For example, MPEG compression schemes may store keyframes and other information that changes values between the keyframes.

Yet another embodiment may analyze the content of the video program. For example, this may analyze all the content within a window of 3 to 20 seconds, and find a "frame" which has the best depiction of some aspect within that window/time period. For example, usually television shows attempt to depict people in various scenes. The system may analyze the content of the frames and define the frame that has the best depiction of a person. For example this may use face analysis to find the face in the scene, and select that face which is closest to the center of the scene in the majority of the frames, for example. This may use more sophisticated techniques, such as information associated with the video that indicates which parts of the video are most important, e.g., coordinates of the video to use for previews or the like.

The television also communicates with a remote device e.g. a remote control 150. The remote produces an output which commands another device, here the TV or set top box to display different viewable content or take some other action. The communication may be one-way from the remote to the television, or bidirectional. The communication can be by infrared, short range RF control such as WiFi or Bluetooth, or via some other network control such as WiFi, or some combination thereof. In one embodiment, certain frames which are stored on the television are transferred to the remote. In this embodiment, the remote also has a screen 155, and the frames 111 may be shown on this screen. These frames may provide the ability to navigate forward or backward.

The remote also has a user interface that can be a cursor that is moved using a trackball joystick or other conventional user interface movement device. Alternatively, the user interface can use or include a touch screen.

For example, consider the situation where you are watching a television. Because of a distraction, or for any other reason, a user missed some dialog, the user may want to jump back so that you can re-hear what's been said and re-view it. A TV 100 and/or set top box may store certain content for that purpose. Frames that are stored on the television may be transferred to the remote include an appropriate selection of frames. A selection of frames will enable finding a frame that would enable an appropriate jump to a desired frame, e.g. all frames within 5 minutes might enable a jump to anywhere within that 5 minutes. These frames that are sent and viewed herein are referred to as preview frames.

Figure 2:
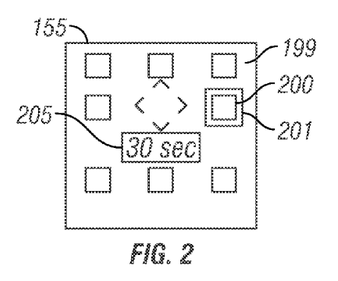
FIG. 2 shows an embodiment of using a remote control for fast forward and/or fast backward.

For example, FIG. 2 shows a detail of the contents for a time jump screen 199 on the screen 155 of the remote 150. In this embodiment, frames may be provided showing content of what would be shown on the TV screen for one second forward or a one second back skip; for a 5 second forward or back 10 seconds, 30 seconds, or others. Selecting any of these frames enables moving forward in time, or back in time by a certain amount of time. A selection such as 201 of a frame such as 200 causes the amount of time associated with that frame to be displayed as 205, prior to selection of that frame.

One embodiment may only allow skipping backwards by certain amounts of time. In the embodiment described above and shown in FIG. 2, the ability to go forward in time may be possible because "time shifted" TV is being watched, for example when a person is watching 10 minutes behind. When watching time shifted TV in this way, the watching position can actually move forward by certain times, e.g., by 10 minutes. This enables you, from the remote, to select frames to which you want to move forward. One use of this might be, for example, to move forward to a different point in the program, or to fast-forward far enough to get over commercials. The move forward is different than a conventional fast forward, since it allows moving directly to another frame. It does so using a technique that allows the user to select where to move, based on which of plural frames to move to. In the embodiment, the remote receives images indicative of frames at different times, and displays those frames as frames 200 on the display of the remote. Then the user can look at the different frames and they could decide by looking at the different frames, which of these frames represented commercial content. Then, the user can select one or more of these frames at which to resume play. Again, that frame can be ahead of the current play location, or behind the current location.

This embodiment therefore provides preview frame samples of different times of viewing, where one preview frame comprises viewing at a time t, and another preview frame comprises viewing at a different time t1, where t1 is a different time than time t.

My copending application Ser. No. 10/455,854, filed Jun. 6, 2003 also describes techniques of how to skip commercials in video content.

By placing the "cursor" 201 over a frame, information about the program can be displayed, e.g., how long is the program, who it stars, etc.

Figure 3:
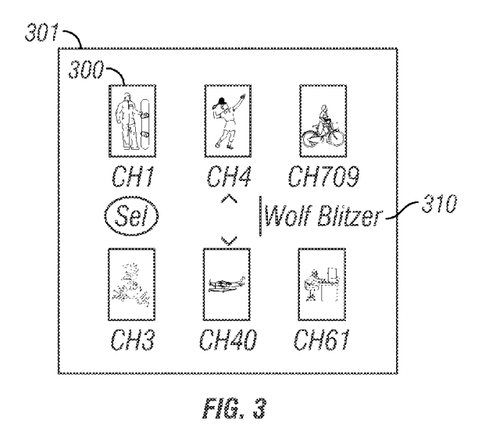
FIG. 3 shows an embodiment of using a remote control for channel selection.

The above embodiment, shown in FIG. 2, is described to show frames for backward and/or forward in time. Another embodiment shown in FIG. 3 mode may view and allow selection of frames as a function of channel. For example FIG. 3 shows how the remote screen 301 can provide channels that are currently available, and which can be viewed on the television. Each of the frames 300 may represent a frame showing what is currently playing on one of the channels, as received from the TV 100 and/or set top box 101.

These different menus can be mixed. The array of current frames may include current frames for the current channel being viewed, and may also include different frames for different channels.

Conventional controls on the remote may be provided such as channel up and channel down, etc. The controls may be associated with preview frames. Next to the channel up button, an information area 310 shows the information that will be obtained if that channel is selected.

The channels can be channels from any source.

Each preview frame 300 shows a miniature version of what is on the television screen. It may show a miniature version of the whole screen.

Figure 6:
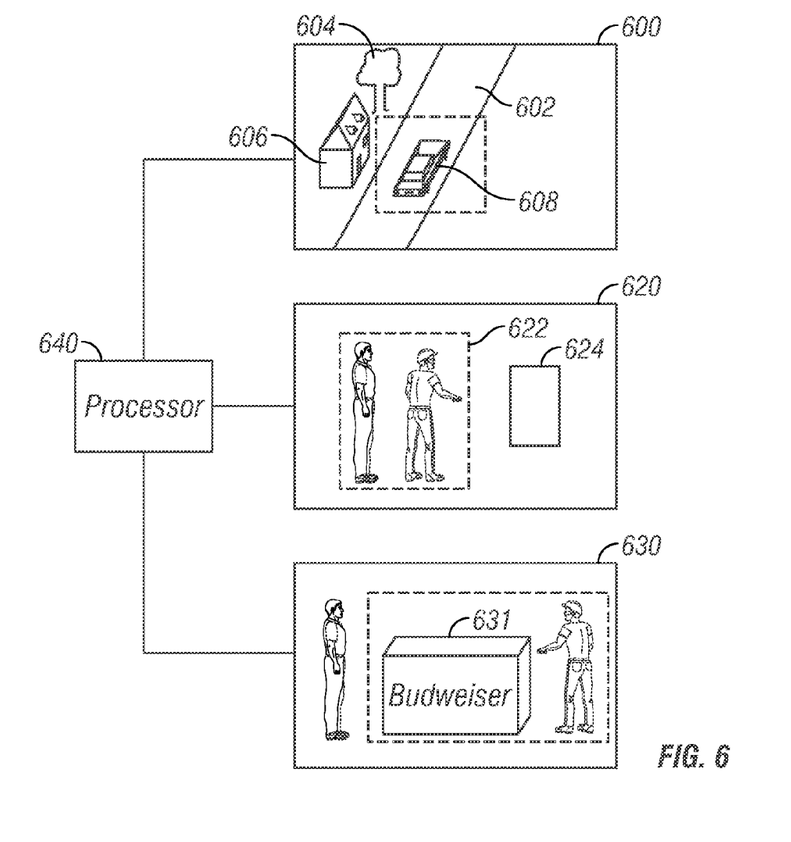
FIGS. 6 and 7 show an embodiment for analyzing the frame to determine content therein to find a reduced size preview frame.

In another embodiment, shown in FIG. 6, the video screen contents are analyzed to find a specific portion of that video screen that should form the preview frame. FIG. 6 illustrates an overall video screen 600 which shows a complete frame. A number of items may be in the frame, such as road 602, trees 604 houses 606 and others. There may be a car shown as 608 moving on the road.

Another video screen shown as 620 may be a screen that shows a number of people together in an area 622, and shows other items in the room such as paintings on the walls 624, or other decorations. Another screen 630 may show, for example, an item 631 where item may be a case of beer and there may be people around the item. The screen 630 may be a conventional screen that you would see in an advertisement.

Each of these screens may be analyzed by a video processor shown at 640 which may find the proper portion of the screen to display as the preview frame. The processor may use the flowchart shown in FIG. 7.

Figure 7:
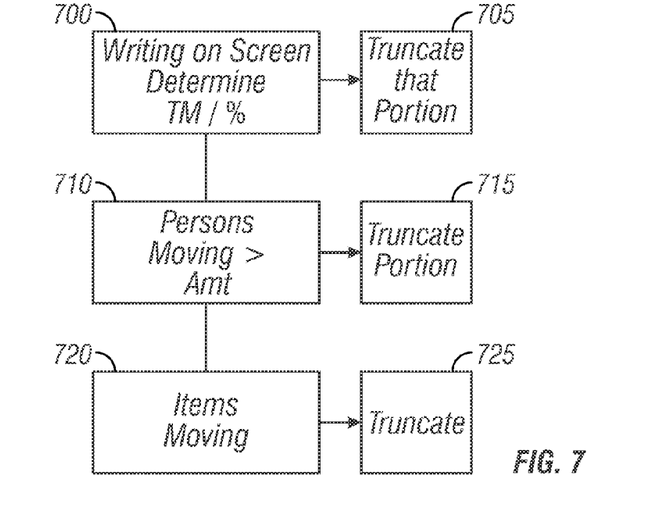

In FIG. 7, at 700, the processor may determine if there is writing on the screen, and if so by using OCR techniques or other similar techniques may determine if the writing is a conventional trademark of an item. For example, the writing on the box 631 which says "Budweiser" may be found within a trademark database. However, the percentage of the screen which is covered by the trademark is also noted. This is an attempt to determine if the subject of the screen is actually the trademark the item. For example if the trademarked item takes up less than 5% of the screen, it may be considered that this is not the trademarked item if the item finds writing that is a trademark and has more than the greater percentage, then at 705 that portion is truncated and taken as being the desired portion. If not, the flow passes to 710 which attempts to find this mean subject of the screen. First, this finds persons who are moving more than a certain amount, which is between frames they have carried out a specified amount of movement. If such persons are found at 710, then that is taken as the truncated portion at 715. If not, items moving are found at 720, and those moving items if found are taken as the truncated portion at 725. 710 may look for the persons moving such as 622 in screen 620. 720 may look for the items moving such as the car traveling in 608 in the screen 600. Each of the truncated portions which are obtained is shown in dotted lines in the FIG. 6.

Other techniques can also be used to find a truncated portion which may provide information to a user about the desired portions of the screen which will tell the most about the screen to a user who is viewing the only the preview frames. For example, the processor 640 may consult a database that indicates the most likely important screen portions.

By this or some other technique, the operation may analyze the content of the scene, find the most likely relevant portion of the television screen, and make a preview screen that shows only a very small portion of the screen, truncated to include only the relevant portion. The relevant portion, for example, may include only one or more persons within each scene.

Other embodiments may show different things on the remote, e.g, the last few channels viewed, with real-time views or views that are recent such as within a few seconds, of what is on those channels. For example, if a user is switching between two channels, the channel last viewed may have preview frames shown on the remote. This may be useful for example if a user is switching channels to avoid a commercial. The user can view another channel, while watching the "previous channel" on the remote.

Another embodiment may provide streaming video onto the remote, which may be a minimized window or a truncated window that only shows part of the complete video screen. Favorite channels can also be shown in the same way. The user can select any of these channels by touching the frame on a touch screen, moving a cursor, or any other way of selecting on a screen.

Figure 4:
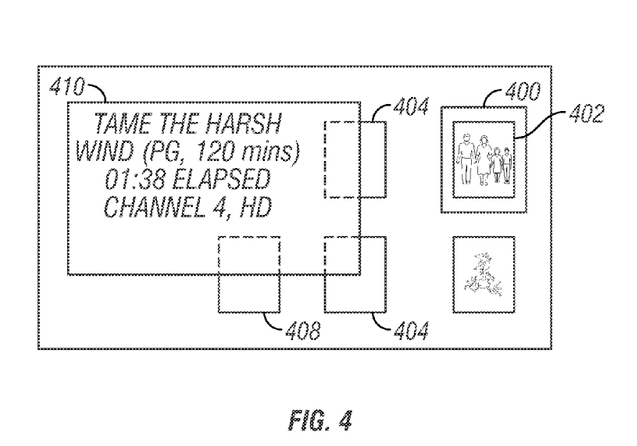
FIG. 4 shows how information can be displayed over other windows.

FIG. 4 shows how hovering a cursor over a frame 402 may also provide additional information 410 about the frame 402. This additional information 410 may be overlaid over the other frames 404, 406, 408. This provides, for example, information such as how long the program is, when it started or other information such as a description or the like. The information may be shown as a balloon hanging over the other frames, and may be partly transparent so that the other frames can be seen through it, for example.

Figure 5A:
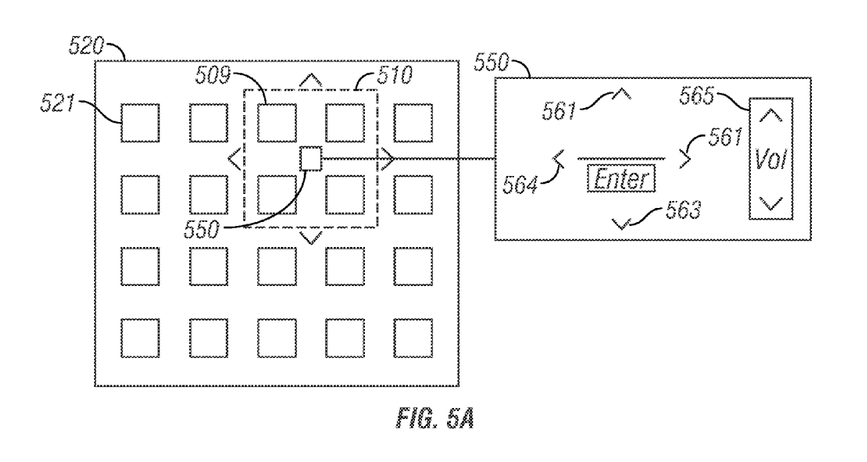
FIGS. 5A and 5B show an embodiment with a sliding selection window over a larger array of preview frames.

One problem being recognized by the present system is that modern television systems provide more channels than can be handled by a small remote. Perhaps the conventional way of dealing with this is by providing a channel guide on the TV screen, or by making users memorize the channel numbers. However, the present system may provide a useful alternative we're the information being seen is actually shown on the display of the remote. In view of this problem, another embodiment shown in FIGS. 5A and 5B allows selection of different portions from a larger screen, only part of which is shown on the screen of the remote device. A complete display 520 has information about all of the possible channels that can be viewed. FIG. 5A shows preview frames 521 for an array of channels. A sliding selection 510 can be moved across the total display 520. Note that the total display will have a many different preview frames such as 521 thereon. Some of the preview frames such as 521 are outside of the sliding area defined by 510. Other preview frames such as 509 are inside that sliding area. Each of the preview frames may be formed as described in previous embodiments.

The embodiment of FIG. 5A illustrates 20 preview frames shown on the screen 520, and only four of those preview frames are inside the sliding area 510, e.g. the displayed portion on the remote. While only 20 different preview frames are shown, of course there could be many more preview frames on the screen, e.g., there may be hundreds of preview frames.

The preview frames can be arranged in any desired way. In one embodiment, for example, the selection area 510 may select only four or six different frames for display on the screen. However, as the selection area 510 slides across the screen area 500, the selection of which preview frames are selected changes.

The sliding selection area 510 includes a menu 550 at some location within the selection area and that slides with the menu across the screen. FIG. 5A shows the menu 550 in the middle of the sliding selection area 510. The menu 550 may include multiple parts; including a navigation part with arrows that allow selection of movement of arrow directions where the movement changes the portion of the menu that is selected. The arrows 561, 562, 563, 564 are selected to move the cursor to different areas within the selection, or to move the selection to the left, right, up or down in embodiments where the total area is larger two dimensionally than the selection as in FIG. 5A. Another embodiment in FIG. 5B may have the complete screen the same width as the sliding part, so that the sliding part moves two dimensionally across the complete screen.

The sliding menu may also include different parts that are preferably always shown on remote controls such as volume up and down 565. Some functions may also be on "hard keys" within the remote also.

Figure 5B:
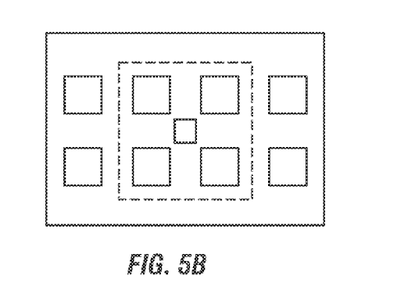

In the two dimensional embodiment, shown in FIG. 5B, moving to the right or left slides the window forming the selection area 510 across the entirety of the screen 500, thereby providing a different selection that is shown to the user. This enables moving to the right or moving to the left for example across a larger selection. The same can be done by moving up and down in any desired logical configuration. In one of the embodiments, the arrows may move one frame at a time when you move them, and may start moving in a faster way when you hold it down, for example first one second per frame, and after one second of holding down may move much faster.

The above has described an operation within a remote control for a television. However, this can be used in a standalone device. In one embodiment, for example, this can be used on the television itself, where the television screen shows the different selection of channels that can be obtained. The whole screen can be logically divided showing different frames from different channels. The electronics within the television can time-shift between one and another tuner, so that at each moment a reasonably up-to-date version of the tuner contents is shown on the screen. In one embodiment, the frames which are closer to the selection area 510 that is currently selected may be updated more frequently than frames which are further than the selection area. For example frames which are close to the selection area 510 sliding screen may be updated twice a second, while frames that are further from the selection area may be updated every 5 seconds. This is because the user is likely to slide to those closer areas, so it is better if those closer areas are more up to date.

Another embodiment shows an operation of using this kind of screen in a portable navigation device, e.g. one that uses global positioning satellites ("GPS") or cell tower triangulation to determine position. This device has a user interface which allows entering a destination for navigation, and the display displays navigation information and information to guide a user to their final destination. In this embodiment, the remote device is a GPS 800 shown in FIG. 8 that may itself show pictoral representations of areas, e.g., with landmarks. An embodiment may provide photographic views of the surroundings. For example, this may use techniques from my co-pending application Ser. No. 12/210,196, filed Sep. 14, 2008. This may also use, for example, drawings or cartoons showing the landmarks.

Figure 8:
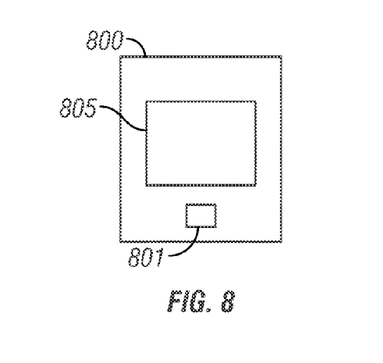
FIG. 8 shows a GPS embodiment.

FIG. 8 shows the GPS device 800 with screen 805 and memory 801. The memory 801 may store as part of the navigation, for example, views such as what the user would see in the future for navigation in a car for example.

Figure 9:
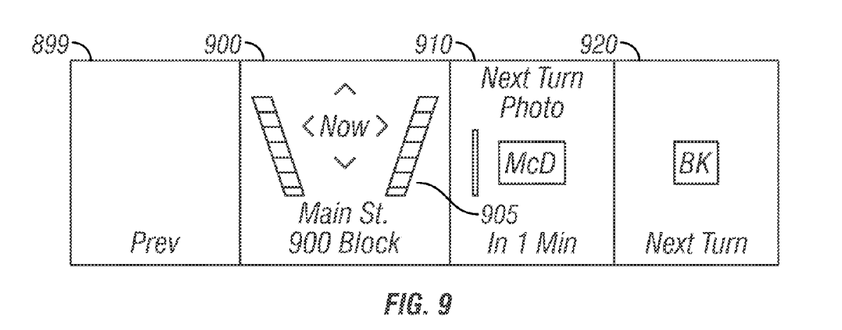
FIG. 9 shows different photographs that can be viewed according to the GPS embodiment.

FIG. 9 shows some exemplary views that may be viewed on the screen 805. For example, if the device determines that the user is on Main Street, 900 block now, the GPS screen 900 that displays "now" may show a photograph 905 of the current area based on stored or obtained photos of main street. This allows a user to see from visual landmarks where they are to help with the navigation. However, the user may also see what is going to happen in the future. For example, the GPS may show a photo of what an area will look like that they are going to arrive to, for example, in 1 minute, as the screen 910. It may show what the area will look like at the next turn at the screen 920. The next turn photo may be stored or downloaded during the time the user is travelling toward the next turn. The next turn photo may be displayed at some time before the next turn, so that the user can see landmarks that will tell the user where to turn. One embodiment may also enable showing photos from previous times, e.g., to determine if they went wrong in the past, or for some other reason.

The photos may be shown in a menu system of the type shown in FIGS. 5A or 5B, e.g., a long window, and with a sliding selection across and/or along a complete array of preview frames, where in this embodiment, the preview frames are the photos of the future areas. These items can also be selected, e.g., to get more information about the items, or to go to some other area of the menu.

Figure 10:
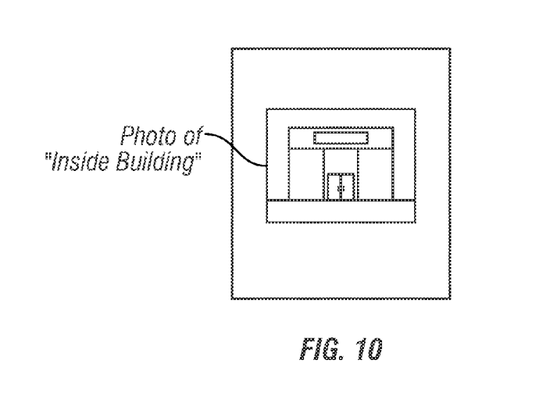
FIG. 10 shows an inside walking embodiment.

An embodiment in FIG. 10 uses the system can also be used for walking navigation, where the system may show photos of buildings and inside the building, to help the user navigate within the area. For example, this may show hallways, elevator banks, and other layouts, where a user can slide between the prestored photos to get to a desired location.

The user, for example, might enter "suite 905" to get a series of photos that can be slid between to guide them to that location. This would be manually assisted, where the user can enter (photo 1), find elevator bank (photo 2), leave elevator (photo 3), go to hallway (photo 4), etc. Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while the above describes a remote control, these techniques described herein can be used on portable devices such as GPS devices, on portable phones, or other. The programs can be television programs, but can also be computer applications or any other kind of application, including navigation programs, or internet programs.

The above describes the frames being of viewable content. Other viewable content can be used in this way. One embodiment, for example, describes using this system for surfing between a number of Internet sites which forms the viewable content. For example, each of the preview frames may be a preview frame of an Internet website which may be a frame of the complete site, or only some selected portions of the site. The menuing system with the sliding portion may be used to slide between different portions of this Internet website. Also, while the above describes mixing different kinds of video programs it should be understood that this invention contemplates that both intranet sites and also video program such as video channels, streaming video, and the like can all be mixed together on this array.

Another embodiment may modify the way in which the preview screens are formed, and may allow users to either set the preview screens themselves, or to set different portions of the preview screens which they want to appear. For example, a user could manually select the portion of a specific screen. Later, other screens that look like that screen may be automatically selected in this way.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electronic device, comprising:
a screen, which shows a number of items, any of which can be selected;
a user interface, which controls allows selecting one of said items, and controls navigation among said items;
a processor, which runs a stored program, to receive content for a number of different frames of viewable content, and displaying preview frames based on said frames of viewable content, said preview frames being updated periodically to show updated preview frames representing different content than at a previous time,
said processor programmed to control selecting one of said preview frames, to provide further information about at least a selected said frame of viewable content, and produce an output which commands another device to select content corresponding to said preview frame;
wherein said processor produces an array of different preview frames, each preview frame having information about said viewable content frame therein, and each representing one item which can be viewed on said remote device, and said screen shows only a selection portion that has a subset of said preview frames, and said user interface controls moving through said array to select different subset of preview frames;
wherein said array of preview frames has different frames which are updated at different periods, where a first frame closer to a selection portion is updated more frequently than a second frame that is further from the selection portion, where the selection portion is an area where said one of said preview frames is selected to produce the output which commands the anther device to select content corresponding to said preview frame.

2. A device as in claim 1, wherein said processor selects automatically only a part of a received frame of viewable content to display said only a part.

3. A device as in claim 2, wherein said processor is programmed to automatically analyze the content of the viewable content frame and to select said part according to rules that specify which part of the viewable content frame is likely most relevant.

4. A device as in claim 3, wherein said processor automatically selects a portion of the viewable content frame which includes a person therein, by selecting a face of a person that is closest to a center of the frame.

5. A device as in claim 1, wherein said array comprises different channels of video information that can be viewed on said another device.

6. A device as in claim 1, wherein at least a subset of said array comprises different times of viewing for a same program, where one preview frame comprises viewing said program at a time t, and another preview frame comprises viewing said program at a different time t1, where t1 is a different time than time t.

7. A device as in claim 1, wherein said information about a selected preview frame is displayed over other preview frames.

8. A device as in claim 1, wherein said frames of viewable content are frames of internet sites.

9. A device as in claim 1, wherein said frames of viewable content are frames of navigation information.

10. An electronic device, comprising:
a screen, which shows a number of items;
a user interface, which controls allows moving among said items;
a processor, which is programmed to receive content for a number of different frames of viewable content, and displaying preview frames based on said frames of viewable content to be displayed on said screen as said items, said preview frames being updated periodically to show updated preview frames representing different content than at a previous time,
wherein said processor produces an array of different preview frames, wherein at least a subset of said array comprises different times of view for a same program, wherein one preview frame comprises viewing said program at a time t, and another preview frame comprises viewing said program at a different time t1, and each preview frame having information about said viewable content frame therein,
and each preview frame representing one item which can be viewed, and said screen shows only a selection portion that has a subset of said preview frames, and said user interface controls a moving through said array to select different subsets of preview frames;
wherein said array of preview frames has different frames which are update at different periods, where a first frame closer to a selection portion is updated more frequently than a second frame that is further from the selection portion, where the selection portion is an area where said one of said preview frames is selected to produce the output which commands the selection of content corresponding to said preview frame.

11. A device as in claim 10, wherein said processor selects automatically only a part of a received frame of viewable content to display said only a part.

12. A device as in claim 11, wherein said processor is programmed to automatically analyze the content of the viewable content frame and to select said part according to rules that specify which part of the viewable content frame is likely most relevant from the single frame.

13. A device as in claim 10, wherein said array comprises different channels of video information that can be viewed, where any of said items on said screen can be selected by said user interface, and where responsive to selecting one of said preview frames, said processor programmed to provide further information about at least a selected said frame of viewable content, and produce an output which commands another device to select content corresponding to said preview frame.

14. A device as in claim 13, wherein said processor is programmed to control selecting one of said preview frames, to provide further information about at least a selected said frame of viewable content, and produce an output which commands another device to select content corresponding to said preview frame.

15. A device as in claim 10, wherein said array of preview frames has different frames which are updated at different periods, where a first frame closer to the selection portion is updated more frequently than a second frame that is further from the selection portion.

16. A device as in claim 10, wherein said frames of viewable content are frames of internet sites.

17. A device as in claim 10, wherein said frames of viewable content are frames of navigation information.

* * * * *